United States Patent [19]
Hamada

[11] Patent Number: 5,326,324
[45] Date of Patent: Jul. 5, 1994

[54] DYNAMIC DAMPER FOR HOLLOW DRIVE SHAFT

[75] Inventor: Masaaki Hamada, Komaki, Japan

[73] Assignee: Tokai Rubber Industries, Ltd., Japan

[21] Appl. No.: 975,515

[22] Filed: Nov. 12, 1992

[30] Foreign Application Priority Data

Nov. 25, 1991 [JP] Japan ................. 3-335634

[51] Int. Cl.⁵ ............................................. F16C 3/00
[52] U.S. Cl. ................................................. 464/180
[58] Field of Search ................... 464/180; 74/574, 607

[56] References Cited

U.S. PATENT DOCUMENTS

| | | | |
|---|---|---|---|
| 3,052,107 | 9/1962 | Kempe | 464/180 |
| 3,075,406 | 1/1963 | Butler, Jr. et al. | 464/180 |
| 4,734,079 | 3/1988 | Viets | 464/180 X |
| 4,825,718 | 5/1989 | Seifert et al. | 464/180 X |
| 4,909,361 | 3/1990 | Stark et al. | 464/180 X |
| 5,056,763 | 10/1991 | Hamada et al. | 464/180 X |

FOREIGN PATENT DOCUMENTS 3-229036 10/1991 Japan.
3288041 12/1991 Japan ................... 464/180

Primary Examiner—Daniel P. Stodola
Assistant Examiner—Eileen A. Dunn
Attorney, Agent, or Firm—Parkhurst, Wendel & Rossi

[57] ABSTRACT

A dynamic damper for a hollow drive shaft, including a damper mass member disposed in a hollow bore of the drive shaft, such that the damper mass member is coaxial with the drive shaft with a predetermined clearance being provided between the damper mass member and an inner circumferential surface of the drive shaft; and a pair of elastic support members respectively fixed to axially opposite ends of the damper mass member, the support members connecting the damper mass member to the drive shaft, thereby elastically supporting the damper mass member.

11 Claims, 3 Drawing Sheets

DYNAMIC DAMPER FOR HOLLOW DRIVE SHAFT

BACKGROUND OF THE INVENTION

1. Field of the Invention

The present invention relates generally to a dynamic damper and particularly to a dynamic damper for a hollow drive shaft of an automotive vehicle.

2. Related Art Statement

It is conventional that a drive shaft of an automotive vehicle is equipped with a dynamic damper for absorbing or attenuating vibration transmitted from a power unit to a vehicle body and preventing lowering of strength of the drive shaft due to metal fatigue thereof. Generally, a conventional dynamic damper includes a cylindrical damper mass member located outside a drive shaft with a suitable clearance provided therebetween, and elastic support means disposed between opposed surfaces of the drive shaft and damper mass for connecting the damper mass to the drive shaft and thereby elastically supporting the damper mass.

Meanwhile, there is a tendency that a conventional solid drive shaft is replaced with a hollow drive shaft which includes a tubular portion having a hollow bore inside. A hollow drive shaft is lighter than a solid drive shaft, and at the same time has flexural and torsional rigidities comparable to those of the solid drive shaft. Therefore, the use of a hollow drive shaft leads to lightening the overall weight of an automotive vehicle.

However, a hollow drive shaft has an outer diameter greater than that of a solid drive shaft. For applying the above-indicated conventional dynamic damper to a hollow drive shaft, it is necessary to adapt the damper mass to have a greater outer diameter, which leads to increasing the overall size of the dynamic damper. However, the enlarged dynamic damper needs widening of space for provision thereof.

In addition, when the damper mass having the increased outer diameter is rotated about the rotation axis thereof, the damper mass produces increased inertia force in the circumferential direction thereof. This means that, when torsional vibration is applied to the damper mass or dynamic damper, increased vibrational load is inputted to the elastic support means of the dynamic damper. This results in extreme reduction in durability of the elastic support means and thus the dynamic damper.

SUMMARY OF THE INVENTION

It is therefore an object of the present invention to provide a dynamic damper having a novel structure, which damper is provided inside a hollow drive shaft of an automotive vehicle and therefore is free of the problem of interference with other parts of the vehicle and the problem of widening of space for provision thereof, and which damper has excellent durability or life expectancy.

The above object has been achieved by the present invention, which provides a dynamic damper for a hollow drive shaft, comprising (a) a damper mass member disposed in a hollow bore of the drive shaft, such that the damper mass member is coaxial with the drive shaft with a predetermined clearance being provided between the damper mass member and an inner circumferential surface of the drive shaft, and (b) a pair of elastic support members respectively fixed to axially opposite ends of the damper mass member, the support members connecting the damper mass member to the drive shaft, thereby elastically supporting the damper mass member.

The dynamic damper in accordance with the present invention is provided in the bore of the drive shaft. That is, the bore of the drive shaft serves as the space for provision of the dynamic damper. Thus, the inventive dynamic damper needs no additional space in contrast to the above-indicated conventional dynamic damper located outside a hollow drive shaft. In addition, the inventive dynamic damper does not interfere with other parts of the automotive vehicle. Moreover, since the damper mass member is supported at the axially opposite ends thereof by the elastic support members, the outer diameter of an axially intermediate portion of the damper mass member can be increased to the greatest value that would not cause the damper mass member to collide with the inner surface of the drive shaft upon application of vibration to the dynamic damper. Therefore, even in the event that a dynamic damper in accordance with the present invention is used with a drive shaft whose inner diameter is considerably small, the dynamic damper can be adapted to have a considerably great weight, thereby producing excellent vibration absorbing effect. Furthermore, since the damper mass member is elastically supported at the axially opposite ends thereof, stable supporting of the damper mass member in the bore of the drive shaft is obtained. Thus, the damper mass member is effectively prevented from colliding with the inner surface of the drive shaft due to vibrations applied in directions oblique to the rotation axis line of the drive shaft. The damper mass member of the present dynamic damper is coaxial with the rotation axis line of the drive shaft. Therefore, the damper mass member produces only a small inertia force in the circumferential direction thereof. This leads to improving the durability of the elastic support members and therefore that of the dynamic damper. In addition, according to the present invention, it is possible to utilize either shearing or compression/tension as the main elastic deformation of the elastic support members upon application of flexural vibration to the drive shaft. This results in improving the degree of freedom as to the design of natural frequency of the dynamic damper.

In a preferred embodiment of the present invention, each of the elastic support members includes a first tubular portion which extends from an outer periphery of a corresponding one of the axially opposite ends of the damper mass in an axially outward direction of the damper mass member while at the same time expanding radially outwardly of the damper mass member, so that the first tubular portion has a truncated conical shape. Each support member further includes a second tubular portion which extends from an axial end of the first tubular portion in the axially outward direction so that the second tubular portion has a cylindrical shape. According to this embodiment, the elastic deformation of the elastic support members upon application of flexural vibration to the dynamic damper is mainly caused by shearing of the support members. Accordingly, event in the even that the weight of the damper mass member is considerably small, the resonance frequency of the dynamic damper can easily be tuned at a considerably low frequency range.

BRIEF DESCRIPTION OF THE DRAWINGS

The above and optional objects, features and advantages of the present invention will be better understood by reading the following detailed description of the presently preferred embodiments of the invention when considered in connection with the accompanying drawings, in which.

DETAILED DESCRIPTION OF THE PREFERRED EMBODIMENTS

Figure 1:
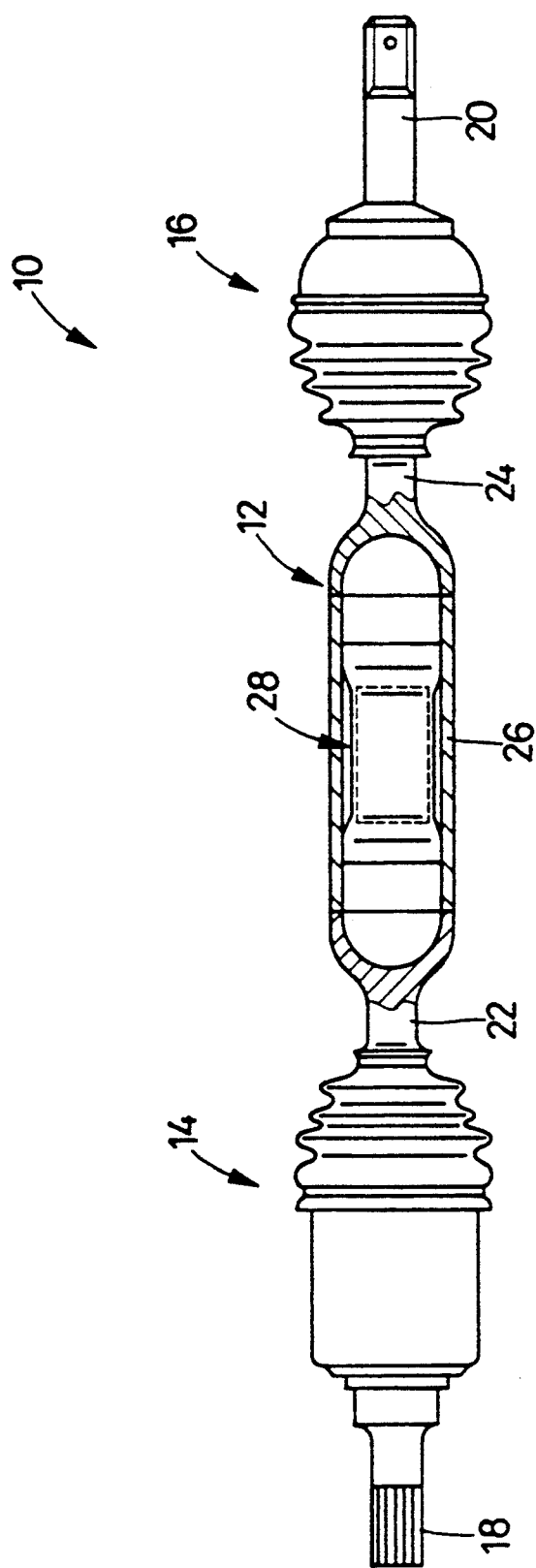
FIG. 1 is a view, partly recessed, of a hollow drive shaft to which is applied a dynamic damper embodying the present invention.

Referring first to FIG. 1, there is shown a hollow drive shaft 10 for a FF (front-engine/front-drive) automotive vehicle. The drive shaft 10 is equipped with a dynamic damper 28 in accordance with the present invention.

The drive shaft 10 has an assembly structure in which a connecting shaft 12 is joined at axially opposite ends 22, 24 thereof to a first and a second attachment shaft 18, 20 via constant velocity universal joints 14, 16, respectively. As is well known in the art, the first attachment shaft 18 is attached to an output shaft of a final reduction gear of the vehicle, and the second attachment shaft 20 is attached to a driven shaft of a front wheel of the vehicle. Consequently, the drive shaft 10 transmits drive power from a power unit of the vehicle to the wheel, thereby rotating the wheel.

The connecting shaft 12 includes an axially intermediate portion 26 located between the axially opposite ends 22, 24. The intermediate portion 26 has the form of a hollow tube having a hollow bore. In the present embodiment, the hollow tube 26 is formed separately from the end parts 22, 24, and is fixed by welding to those parts 22, 24.

Figure 2:
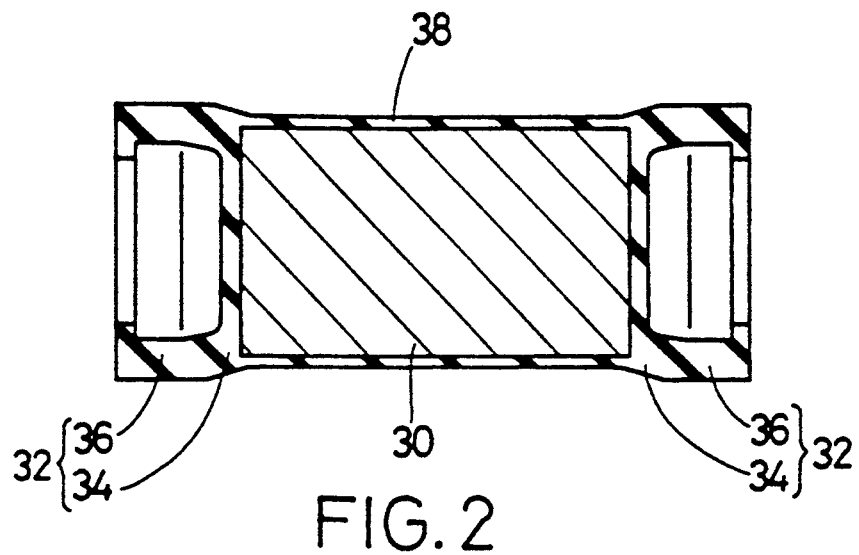
FIG. 2 is a longitudinal cross-sectional view of the dynamic damper used with the drive shaft of FIG. 1.
Figure 3:
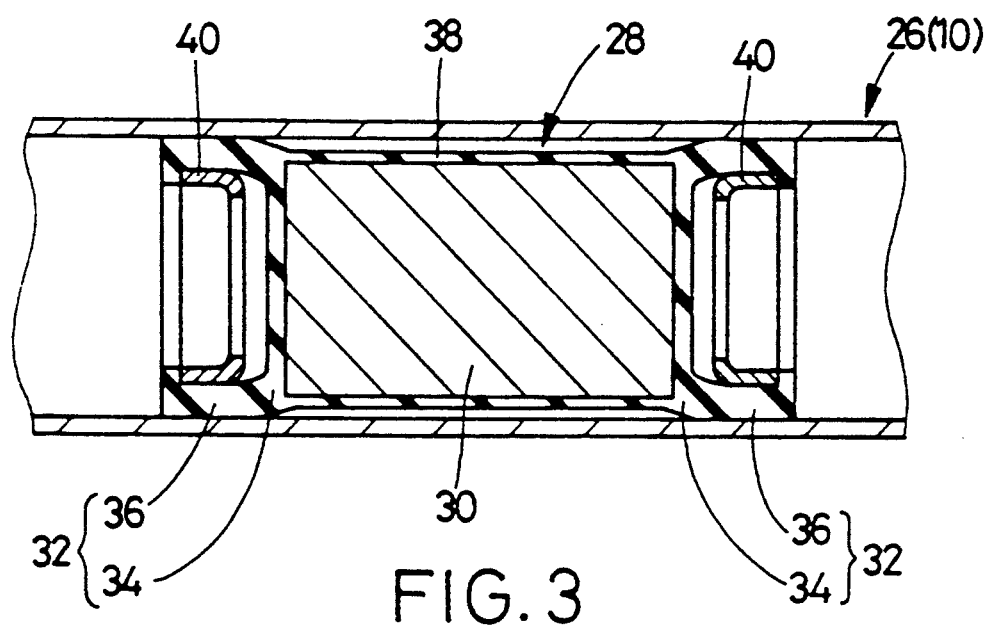
FIG. 3 is a longitudinal cross-sectional view of the dynamic damper disposed in the drive shaft of FIG. 1.

The dynamic damper 28 is disposed in the bore of the hollow tube 26 of the connecting shaft 12. As shown in FIG. 2, the dynamic damper 28 includes a damper mass member 30, and a pair of elastic support members 32, 32 each of which is fixed by vulcanization to a corresponding one of axially opposite ends of the damper mass 30. The elastic supports 32 are formed of rubber.

The damper mass 30 is formed of metal and has the shape of a solid rod having a circular cross section. An outer circumferential surface of the damper mass 30 is covered with a protective rubber layer 38. The rubber layer 38 is formed integrally with the rubber supports 32, 32. The damper mass 30 has an outer diameter smaller by a predetermined value (e.g., about 2 to 4 mm) than an inner diameter of the hollow tube 26 of the connecting shaft 12. Therefore, with the dynamic damper 28 being disposed in the hollow tube 26 of the connecting shaft 12, the damper mass 30 is displaceable radially of the connecting shaft 12, i.e., in directions perpendicular to the rotation axis line of the connecting shaft 12.

Each of the rubber supports 32, 32 includes a tubular support portion 34 extending from an outer periphery of a corresponding one of the axially opposite ends of the damper mass 30 in an axially outward direction of the damper mass 30 while at the same time expanding radially outwardly of the same 30. Thus, the support portion 34 has a tapered cylindrical (or truncated conical) shape. Each rubber support 32 additionally includes a tubular attachment portion 36 extending from an axial end of a corresponding support portion 34 in the axially outward direction of the damper mass 30. The attachment portion 36 has a normal cylindrical shape.

Before the damper mass 28 constructed as described above is disposed in the hollow tube 26 of the connecting shaft 12, a cylindrical metal member 40 is fitted inside the tubular attachment portion 36 of each of the rubber supports 32, 32. Thereafter, the dynamic damper 28 is inserted in the hollow tube 26 of the connecting shaft 12, so that the attachment portions 36, 36 are compressed between the metal members 40, 40 and the inner circumferential surface of the hollow tube 26. Thus, the dynamic damper 28 is connected to the connecting shaft 12, and is elastically supported by the connecting shaft 12.

More specifically described, the damper mass 30 is supported at the axially opposite ends thereof by the hollow tube 26 of the connecting shaft 12 through the support portions 34, 34 of the rubber supports 32, 32. In this condition, the damper mass 30 is coaxial with the hollow tube 26. When the dynamic damper 28 is disposed in the hollow tube 26 of the connecting shaft 12, the attachment portions 36, 36 of the rubber supports 32, 32 (i.e., positions of the elastic connection between the dynamic damper 28 and the drive shaft 10) are preferably positioned around the antinode, or one of the antinodes, of flexural resonance mode of the drive shaft 10 as a main vibration system, for improving vibration absorbing effect produced by the dynamic damper 28 as a secondary vibration system.

With the dynamic damper 28 being disposed in the hollow tube 26, a predetermined clearance is provided between an outer circumferential surface of each of the support portions 34, 34 of the rubber supports 32, 32 and the inner surface of the hollow tube 26, and a predetermined clearance is provided inside an inner circumferential surface of each of the support portions 34, 34. Those clearances permit each of the support portions 34, 34 to elastically deform, thereby permitting the damper mass 30 to displace radially of the hollow tube 26. Thus, the damper mass 30 is elastically supported by the hollow tube 26 through the support portions 34, 34 of the rubber supports 32, 32.

In the present embodiment, the support portions 34, 34 each are formed having a truncated conical shape, and the radial displacement of the damper mass 30 is caused mainly by shearing deformation of the support portions 34, 34.

In the connecting shaft 12 including the hollow tube 26 in which the dynamic damper 28 is provided, the dynamic damper 28 effectively functions as the secondary vibration system for the connecting shaft 12 of the drive shaft 10 as the main vibration system.

The resonance frequency of the radial vibration of the dynamic damper 28 is tuned by adjusting the mass of the damper mass 30 and/or the spring constants of the support portions 34, 34, depending upon the resonance frequency of the flexural vibration of the connecting shaft 12. Consequently, the dynamic damper 28 exhibits excellent vibration absorbing effect against the resonant flexural vibration of the connecting shaft 12.

Since the dynamic damper 28 is provided inside the drive shaft 10, no additional space is necessary for provision of the dynamic damper 28, and the dynamic damper 28 does not interfere with other parts of the vehicle.

Since the dynamic damper 28 has the structure in which the damper mass 30 is supported at the axially opposite ends thereof by the rubber supports 32, 32, the outer diameter of the damper mass 30 can be increased up to a value which causes the damper mass 30 to resonate with a maximum amplitude at which the damper mass 30 does not collide with the inner surface of the hollow tube 26. Therefore, the weight of the damper mass 30 can be increased up to a sufficiently high value ensuring that the dynamic damper 28 produces excellent vibration absorbing effect.

The above-indicated structural feature that the damper mass 30 is supported at the axially opposite ends thereof by the rubber supports 32, 32, results in preventing the damper mass 30 from unstable displacement upon application thereto of vibration in directions oblique to the rotation axis line of the connecting shaft 12. Thus, it is possible to employ an axially long damper mass member 30 while at the same time preventing the damper mass 30 from colliding with the inner surface of the hollow tube 26.

The damper mass 30 of the dynamic damper 28 is coaxial with the rotation axis line of the connecting shaft 12. Therefore, the damper mass 30 produces only a small inertia force in the circumferential direction thereof. Consequently, the amount of deformation of the rubber supports 32, 32 (or support portions 34, 34 thereof) caused by torsional vibration of the connecting shaft 12 is extremely reduced. This leads to improved the durability of the dynamic damper 28.

In the present dynamic damper 28, the elastic deformation of the support portions 34, 34 upon application of flexural vibration to the dynamic damper 28, is mainly caused by shearing of the support portions 34, 34. Therefore, even in the case where the weight of the damper mass 30 is considerably small, the resonance frequency of the dynamic damper 28 can easily be tuned at a considerably low frequency range, by changing the spring constants of the rubber supports 32, 32. In addition, even in the case where the diameter of the hollow tube 26 is considerably small, the size of the dynamic damper 28 can be reduced for provision thereof inside the small diameter hollow tube 26 while at the same time the excellent vibration absorbing effect thereof is not lowered.

Moreover, upon application of either flexural or torsional vibration to the dynamic damper 12, the elastic deformation of the support portions 34, 34 is mainly caused by shearing thereof. Therefore, even if the resonance frequency of the radial vibration of the dynamic damper 28 is tuned depending upon the frequency of the flexural vibration of the connecting shaft 12 in the above described manner, the spring constants of the support portions 34, 34 with respect to the torsional vibration are not adversely lowered, therefore the durability of the support portions 34, 34 against the torsional vibration is advantageously maintained.

The protective rubber layer 38 which entirely covers the outer surface of the damper mass 30, serves to prevent generation of shock or impact noise when the damper mass 30 collides with the inner surface of the hollow tube 26 upon application of excessively large vibration to the dynamic damper 28.

The present dynamic damper 28 has the protective layer 38 for absorbing shock due to collision of the damper mass 30 with the wall of the hollow tube 26 upon application of excessively large vibration. However, it is possible to provide, in addition to, or in place of, the protective layer 38, a stopper means for limiting the radial displacement of the damper mass 30 relative to the wall of the hollow tube 28 upon application of excessively large vibration.

Figure 4:
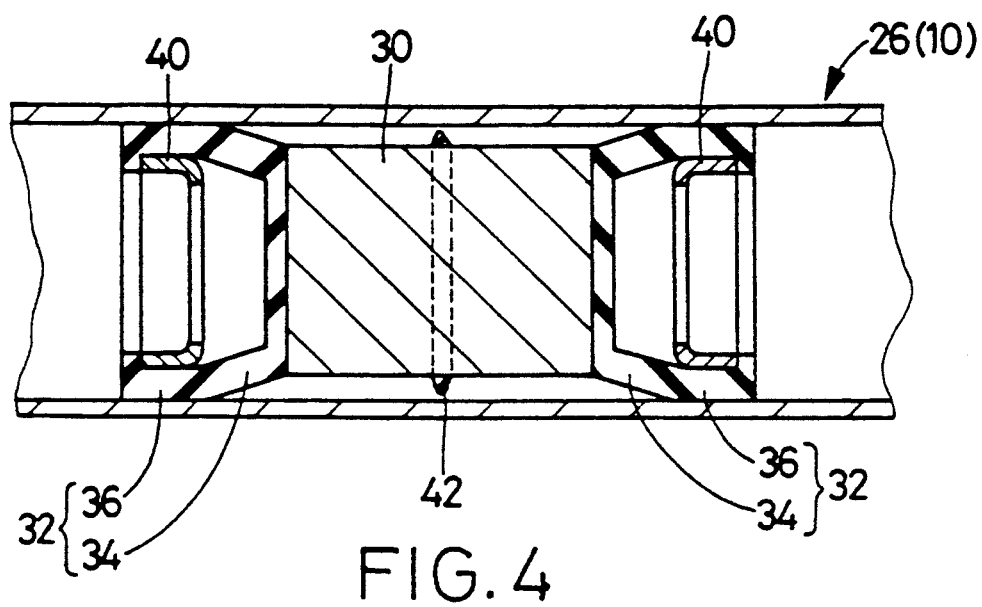
FIG. 4 is a longitudinal cross-sectional view corresponding to FIG. 3, showing another embodiment of the dynamic damper in accordance with the present invention.

For example, as shown in FIG. 4, an elastic annular member 42 is provided on the outer circumferential surface of the damper mass 30. The annular member 42 extends radially outwardly of the damper mass 30, and has a tapered cross section as shown in the figure. The annular member 42 elastically deforms upon collision with the inner circumferential surface of the hollow tube 26, thereby limiting the radial displacement of the damper mass 30.

A plurality of annular members 42 may be provided at suitable intervals of distance on the outer surface of the damper mass 30 in the axial direction thereof. Subject to the condition that the elastic annular member 42 does not have significant influence to the spring characteristics of the two rubber supports 32, 32 as a support spring system, the annular member 42 may have a height which causes the top of the annular member 42 to contact the inner surface of the hollow tube 26 with no vibration being applied to the dynamic damper 28.

In the illustrated dynamic damper 28, the support portions 34, 34 of the rubber supports 32, 32, which elastically connect the damper mass 30 to the hollow tube 26, have no compression/tension portion but have the particular shapes subject only to shearing. However, depending upon required vibration absorbing characteristics, the dynamic damper 28 may have, in place of the rubber supports 32, 32, rubber supports with shapes including compression/tension portions directly connecting between the radially opposed surfaces of the damper mass 30 and hollow tube 26, that is, between the outer surface of the damper mass 30 and the inner surface of the hollow tube 26.

Figure 5:
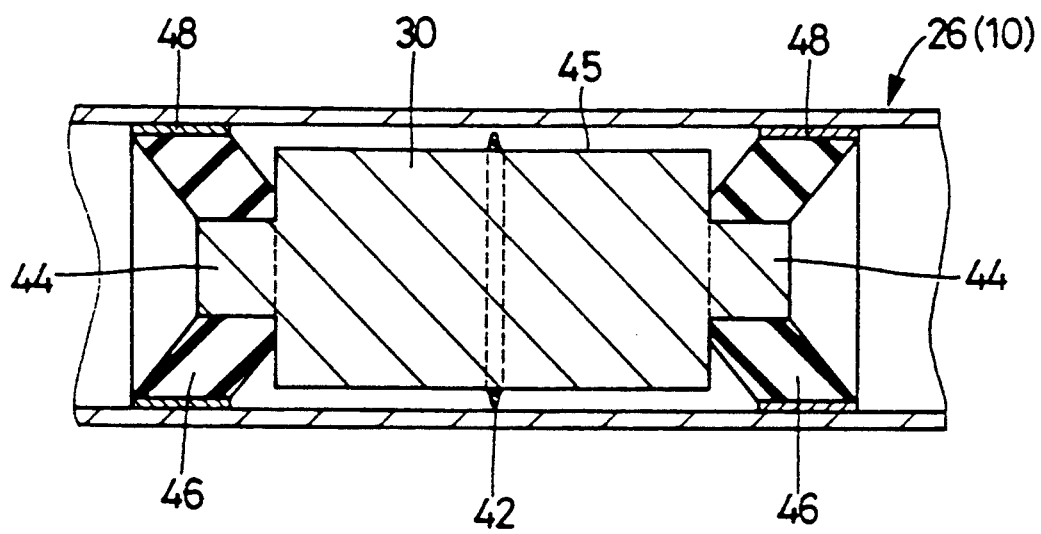
FIG. 5 is a longitudinal cross-sectional view corresponding to FIG. 3, showing yet another embodiment of the dynamic damper in accordance with the present invention.

For example, as shown in FIG. 5, small diameter portions 44, 44 are provided at the axially opposite ends of the damper mass 30, and tubular elastic support members 46, 46 are provided between the small diameter portions 44, 44 and the inner surface of the hollow tube 26 to connect the damper mass 30 to the hollow tube 26 (or connecting shaft 12) and thereby elastically support the damper mass 30. The diameters of the small diameter portions 44, 44 are smaller than that of an axially intermediate portion 45 of the damper mass 30. The rubber supports 46, 46 are formed of rubber and have shapes subject to compression and tension between the small diameter portions 44, 44 and the inner surface of the hollow tube 26. In the figure, reference numerals 48, 48 designate press-fit rings to which the rubber supports 46, 46 are fixed by vulcanization. The press-fit rings 48, 48 form outer circumferential surfaces of the rubber supports 46, 46. With the rings 48, 48 being press fitted in the hollow tube 26, the rubber supports 46, 46 (or dynamic damper 28) are secured to the inner surface of the hollow tube 26.

By using the rubber supports 46, 46 having the shapes including compression/tension portions in addition to, or in place of, shearing portions, the degree of freedom as to the design of natural frequency of the dynamic damper 28 is largely improved, that is, a natural frequency is selected in a largely widened range.

Similar to the rubber supports 32, 32 in the preceding embodiment, even the rubber supports 46, 46 including the compression/tension portions require no additional space for provision thereof because the rubber supports 46, 46 are disposed inside the hollow tube 26 of the connecting shaft 12 (or drive shaft 10). In addition, the outer diameter of the damper mass 30 may be increased up to the greatest possible value that would not cause the damper mass 30 to collide with the inner surface of the hollow tube 26 upon application of vibration to the dynamic damper 28. Consequently, the damper mass 30 or dynamic damper 28 exhibits excellent vibration absorbing effect. Furthermore, since the damper mass 30 is supported at the axially opposite ends thereof, the damper mass 30 is effectively prevented from unstable displacement due to the vibration applied thereto in directions oblique to the rotation axis line of the hollow tube 20.

While the present invention has been described in its presently preferred embodiments, the present invention may otherwise be embodied.

For example, the shapes of the rubber support members of the dynamic damper 28 are determined depending upon the frequencies of vibrations of the drive shaft 10 as the main vibration system, which vibrations are to be absorbed by the dynamic damper 28. Thus, the shapes of the rubber support members are not limited to those of the illustrated rubber supports 32, 32 or 46, 46.

In addition, the means for securing the rubber support members to the drive shaft 10 are not limited to the metal members 40, 40 or press-fit rings 48, 48 of the illustrated dynamic damper 28. For example, it is possible to employ rubber support members (32, 32; 46, 46) having outer diameters greater than the inner diameter of the hollow tube 26 and press fit the rubber supports in the hollow tube 26, so that the rubber supports are directly secured to the hollow tube 26 because of elasticity thereof.

While the illustrated dynamic damper 28 is tuned to exhibit excellent vibration absorbing effect against the flexural vibration of the drive shaft 10, it is possible to provide a dynamic damper which is tuned to effectively absorb the torsional vibration of the drive shaft 10, in addition to the flexural vibration of the same 10. This is achieved by, for example, appropriately changing the shapes of the rubber support members 32, 32 or 46, 46.

In the even that an axially long drive shaft 10, employed in an automotive vehicle, resonates at frequencies (secondary, tertiary, . . . ) higher than that of the primary flexural resonance thereof which occurs with a single antinode, a plurality of dynamic dampers in accordance with the present invention may be provided around respective antinodes of the secondary or tertiary resonance mode of the single drive shaft 10.

It is to be understood that the present invention may be embodied with other changes, improvements or modifications that may occur to those skilled in the art without departing from the scope and spirit of the invention defined in the appended claims.

What is claimed is:

1. A dynamic damper for a hollow drive shaft, comprising:
a damper mass member disposed in a hollow bore of said drive shaft, such that said damper mass member is coaxial with said drive shaft with a predetermined clearance being provided between said damper mass member and an inner circumferential surface of said drive shaft; and
a pair of elastic support members respectively fixed to axially opposite ends of said damper mass member, said support members connecting said damper mass member to said drive shaft, thereby elastically supporting said damper mass member, each of said elastic support members including a tubular portion which extends from an outer periphery of a corresponding one of said axially opposite ends of said damper mass member in an axially outward direction of said damper mass member while at the same time expanding radially outwardly of said damper mass member, so that said tubular portion has a truncated conical shape.

2. A dynamic damper according to claim 1, wherein said damper mass member has an outer diameter smaller by a predetermined value than an inner diameter of said drive shaft.

3. A dynamic damper according to claim 1, further comprising stop means for limiting radial displacement of said damper mass member relative to said inner surface of said drive shaft upon application of an excessively large vibrational load to said drive shaft.

4. A dynamic damper according to claim 3, wherein said stop means comprises at least one elastic annular member which is provided on an outer surface of said damper mass member and extends radially outwardly of said damper mass member, said annular member elastically deforming upon collision with said inner surface of said drive shaft, thereby limiting said radial displacement of said damper mass member.

5. A dynamic damper according to claim 1, wherein said drive shaft includes a connecting shaft, and a first and a second attachment shaft which are joined with axially opposite ends of said connecting shaft via universal joints, respectively, said connecting shaft including an axially intermediate tubular portion located between said axially opposite ends thereof, said tubular portion including said hollow bore and inner surface of said drive shaft, said damper mass member consisting of a rod and being coaxial with said tubular portion.

6. A dynamic damper according to claim 1, wherein said damper mass member is formed of metal and consists of a solid rod having a circular cross section, said elastic support members being formed of rubber and being fixed by vulcanization to axially opposite ends of said solid rod.

7. A dynamic damper according to claim 1, further comprising a protective layer covering an outer surface of said damper mass member, said protective layer being formed integrally with said elastic support members.

8. A dynamic damper for a hollow drive shaft, comprising:
a damper mass member disposed in a hollow bore of said drive shaft, such that said damper mass member is coaxial with said drive shaft with a predetermined clearance being provided between said damper mass member and an inner circumferential surface of said drive shaft; and
a pair of elastic support members respectively fixed to axially opposite ends of said damper mass member, said support members connecting said damper mass to said drive shaft, thereby elastically supporting said damper mass member, each of said elastic support members including a first tubular portion which extends from an outer periphery of a corresponding one of said axially opposite ends of said damper mass member in an axially outward direction of said damper mass member while at the same time expanding radially outwardly of said damper mass member, so that said first tubular portion has a truncated conical shape, said each support member further including a second tubular portion which extends from an axial end of said first tubular portion in said axially outward direction so that said second tubular portion has a cylindrical shape.

9. A dynamic damper according to claim 8, further comprising an annular metal member which is fitted inside said second tubular portion of said each elastic support member, said second tubular portion being compressed between said metal member and said inner surface of said drive shaft with said damper mass member being disposed in said hollow bore of said drive shaft, so that said damper mass member is connected at said axially opposite ends thereof to said drive shaft and is elastically supported by said drive shaft, a predetermined hollow space being provided between an outer circumferential surface of said first tubular portion of said each support member and said inner surface of said drive shaft, a predetermined hollow space being provided inside an inner circumferential surface of said first tubular portion of said each support member, said two hollow spaces permitting said first tubular portion of said each support member to deform mainly by shearing, and thereby permitting said damper mass member to displace radially of said drive shaft.

10. A dynamic damper for a hollow drive shaft, comprising:

a damper mass member disposed in a hollow bore of said drive shaft, such that said damper mass member is coaxial with said drive shaft with a predetermined clearance being provided between said damper mass member and an inner circumferential surface of said drive shaft, said damper mass member including an axially intermediate portion having a first diameter and a pair of axially opposite end portions each of which has a second diameter smaller than said first diameter of said intermediate portion; and a pair of elastic support members each of which is provided between a corresponding one of said axially opposite end portions and said inner surface of said drive shaft so as to connect said damper mass member to said drive shaft and thereby elastically support said damper mass member, said each support member having a truncated conical tubular shape and being subject to compression and tension between said corresponding one end portion of said damper mass member and said inner surface of said drive shaft.

11. A dynamic damper according to claim 10, further comprising a press-fit ring to which said each elastic support member is fixed by vulcanization, said press-fit ring providing an outer circumferential surface of said each support member, said each support member being secured to said inner surface of said drive shaft with said ring being press fitted in said hollow bore of said drive shaft.

* * * * *